US011599345B2

(12) United States Patent
Deng et al.

(10) Patent No.: US 11,599,345 B2
(45) Date of Patent: *Mar. 7, 2023

(54) LANGUAGE INTEROPERABILITY TO AUTOMATE CODE ANALYSIS

(71) Applicant: MICROSOFT TECHNOLOGY LICENSING, LLC., Redmond, WA (US)

(72) Inventors: Shao Kun Deng, Bellevue, WA (US); Matthew Glenn Jin, Seattle, WA (US); Shuvendu Lahiri, Sammamish, WA (US); Xiaoyu Liu, Bothell, WA (US); Xin Shi, Seattle, WA (US); Neelakantan Sundaresan, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,971

(22) Filed: Nov. 4, 2021

(65) Prior Publication Data

US 2022/0058007 A1    Feb. 24, 2022

Related U.S. Application Data

(63) Continuation of application No. 15/931,234, filed on May 13, 2020, now Pat. No. 11,175,897.

(51) Int. Cl.
*G06F 8/41* (2018.01)
*G06F 16/23* (2019.01)
(Continued)

(52) U.S. Cl.
CPC ............ *G06F 8/447* (2013.01); *G06F 8/433* (2013.01); *G06F 8/437* (2013.01); *G06F 8/53* (2013.01);
(Continued)

(58) Field of Classification Search
None
See application file for complete search history.

(56) References Cited

U.S. PATENT DOCUMENTS

| 6,823,507 | B1 | 11/2004 | Srinivasan et al. |
| 7,900,193 | B1 | 3/2011 | Kolawa et al. |
| 10,303,469 | B1 | 5/2019 | Neatherway et al. |
| 11,392,844 | B1 * | 7/2022 | Rao .......................... G06N 20/00 |

(Continued)

OTHER PUBLICATIONS

"Automate your Workflow from Idea to Production", Retrieved from: https://web.archive.org/web/20200509205330/https://github.com/features/actions, May 9, 2020, 11 Pages.
(Continued)

*Primary Examiner* — Qing Chen

(57) ABSTRACT

Language interoperability between source code programs not compatible with an interprocedural static code analyzer is achieved through language-independent representations of the programs. The source code programs are transformed into respective intermediate language instructions from which a language-independent control flow graph and a language-independent type environment is created. A program compatible with the interprocedural static code analyzer is generated from the language-independent control flow graph and the language-independent type environment in order to utilize the interprocedural static code analyzer to detect memory safety faults.

20 Claims, 11 Drawing Sheets

(51) Int. Cl.
G06F 16/21 (2019.01)
G06F 8/53 (2018.01)
G06F 11/36 (2006.01)

(52) U.S. Cl.
CPC ........ G06F 11/3604 (2013.01); G06F 16/219 (2019.01); G06F 16/2379 (2019.01)

(56) References Cited

U.S. PATENT DOCUMENTS

| | | |
|---|---|---|
| 2007/0234297 A1 | 10/2007 | Zorn et al. |
| 2008/0072214 A1 | 3/2008 | Peyton |
| 2009/0119648 A1 | 5/2009 | Chess et al. |
| 2019/0179727 A1 | 6/2019 | Bouissou |
| 2020/0125478 A1 | 4/2020 | Iyer et al. |
| 2020/0394028 A1* | 12/2020 | Byrne ................. G06F 9/45558 |

OTHER PUBLICATIONS

"How Static Analysis Works—GrammaTech Code Sonar", Retrieved From: https://www.verifysoft.com/en_grammatech_how_static_analysis_works.html, Sep. 28, 2017, 2 Pages.

"Mono.Cecil", Retrieved from: http://web.archive.org/web/20200429125717/https://www.mono-project.com/docs/tools+libraries/libraries/Mono.Cecil/, Apr. 29, 2020, 2 Pages.

"Notice of Allowance Issued in U.S. Appl. No. 15/931,234", dated Jul. 16, 2021, 16 Pages.

Berdine, et al., "Smallfoot: Modular Automatic Assertion Checking with Separation Logic", In Proceedings of International Symposium on Formal Methods for Components and Objects, Nov. 1, 2005, 23 Pages.

Calcagno, et al., "Infer: An Automatic Program Verifier for Memory Safety of C Programs", In Proceedings of NASA Formal Methods Symposium, Apr. 18, 2011, pp. 459-465.

Jambon, et al., "Welcome to ATD's Documentation!", Retrieved from: https://web.archive.org/web/20181205001706/https://atd.readthedocs.io/en/latest/, Dec. 5, 2018, 3 Pages.

Ma, et al., "SymWalker: Symbolic Execution in Routines of Binary Code", In Proceedings of the Tenth International Conference on Computational Intelligence and Security, Nov. 15, 2014, pp. 694-698.

O'Hearn, Peter, "Separation Logic", In Journal of Communications of the ACM, vol. 62, Issue 2, Feb. 2019, pp. 86-95.

"International Search Report and Written Opinion Issued in PCT Application No. PCT/US21/025839", dated Jul. 16, 2021, 15 Pages.

Tonder, et al., "Static Automated Program Repair for Heap Properties", In Proceedings of ACM/IEEE 40th International Conference on Software Engineering, May 27, 2018, pp. 151-162.

Villard, Jules, "Infer: A Static Analyzer for Catching Bugs before you Ship", In FOSDEM, Feb. 4, 2017, 41 Pages.

* cited by examiner

Procedure Description
500

- 502 ~ "System.Void.Cilsil.Test.Assets.TestClass::InitializeInstanceObjectField(System.Boolean)": {
- 504 ~ "pd_id":2,
  "pd_attributes":{
- 508 ~ "access": "Pubic",
  "proc_name": {
    "method_name": "InitializeInstanceObjectField",
    "parameters": [
- 510 ~ "System.Boolean" ],
    "class_name": "Cilcil.Test.Assets.TestClass",
    "return_type": "System.Void",
    "is_static": false }
  "formals": [
- 512 ~ {
    "name": "this",
    "type": {
      "kind": "Pk_pointer",
      "type": {
- 514 ~ "struct_name": "Cilsil.Test.Assets.TestClass",
        "type_kind": "Tstruct"
      },
      "type_kind": "Tptr"
    }},
    {
    "name": "initializeToNull",
    "type": {
- 516 ~ "kind": "IBool",
      "type_kind": "Tint"
    }}],
  "method_annotations": {
    "return_value": {
      "annotations": []
    },
    "params": []
  },
  "loc": {
    "line": 46,
    "col": 9,
- 518 ~ "source_file": {
      "path_type": "Relative",
      "path": "...Public/testcode/TestClass/TestClass/Program.cs" }}
  "ret_type": {
- 520 ~ "type_kind": "Tvoid" }},
  "pd_nodes": [ 9, 10, 11, 12, 13, 14],
- 522 ~ "pd_start_node":9,
  "pd_exit_node": 10
  }

506 brackets group 508–522

*FIG. 5*

Node List 600

```
{
  "nd_id":9,
  ...
},                                          ~ 602
...
{
  "stmt_node_kind": "MethodBody",           ~ 608
  "nd_id": 12,                              ~ 604
  "nd_exn_ids": [ 11 ],
  "nd_instrs": [
    { "identifier": {
        "kind": "Normal",
        "name": "n",                        ~ 612
        "stamp": 0 },
      "expression": {
        "pvar": {
          "proc_name": {
            "method_name": "InitialInstanceObjectField",
            "parameters": [ "System.Boolean" ],
            "class_name": "Cilsil.Test.Assets.TestClass",   ~ 616   ~ 614
            "return_type": "System.Void",
            "is_static": false },
          "pv_name": "this",
          "pv_kind": "LocalVariable" },
        "expr_kind": "LvarExpression" },
      "type": {
        "kind": "Pk_pointer",
        "type": { "struct_name": "Cilsil.Test.Assets.TestClass", "type_kind": "Tstruct"},
        "type_kind": "Tstruct"                                                          ~ 618
        },
      "type_kind": "Tptr"
    },
    "location": {
      "line": 47,
      "col": 13,
      "source_file": {                      ~ 620
        "path_type": "Relative",
        "path":  ".../Public/testcode/TestClass/TestClass/Program.cs"
  }}}
  ...
```

Type Environment 700

```json
{
    "type_name": {
        "csu_kind": "Class",
        "name": "Cilsil.Test.Assets.TestClass2",
        "type_name_kind": "CsuTypeName"
    },                                                          ⎫ 702

"type_struct": {
        "instance_fields": [
            {
                "field_name": "Cilsil.Test.Assets.TestClass2.Field",
                "type": {
                    "kind": "Pk_pointer",
                    "type": {
                        "struct_name": "Cilsil.Test.Assets.TestClass",
                        "type_kind": "Tstruct"
                    },
                    "type_kind": "Tptr"
                },
                "annotation": {
                    "annotations": []
                }
            }
        ],                                                      ⎫ 704
        "static_fields": [],
        "supers": [
            {
                "csu_kind": "Class",
                "name": "System.Object",
                "type_name_kind": "CsuTypeName"
            }
        ],                                                      ⎫ 706
        "methods": [
            {
                "method_name": ".ctor",
                "parameters": [
                    "Cilsil.Test.Assets.TestClass"
                ],
                "class_name": "Cilsil.Test.Assets.TestClass2",
                "return_type": "System.Void",
                "is_static": false
            },
            {
                "method_name": "ProblemMethod",
                "parameters": [],
                "class_name": "Cilsil.Test.Assets.TestClass2",
                "return_type": "System.Void",
                "is_static": false
            }
        ],                                                      ⎫ 708
        "annotations": []
    }
},
```

FIG. 7

LANGUAGE INTEROPERABILITY TO AUTOMATE CODE ANALYSIS

CROSS-REFERENCE TO RELATED APPLICATIONS

This is a continuation of application Ser. No. 15/931,234 (now U.S. Pat. No. 11,175,897) filed on May 13, 2020, entitled "LANGUAGE INTEROPERABILITY TO AUTOMATE CODE ANALYSIS", the entirety of which is incorporated by reference.

BACKGROUND

During the development of a program or software, a range of measures is taken to ensure that the program is tested prior to the release and distribution of the program. These measures are aimed at reducing the number of bugs in the program in order to improve the quality of the program. A bug in a source code program is an unintended state in the executing program that results in undesired behavior. Tests are used to identify program errors for a limited number of cases since it is impossible to test all possible user scenarios. Tests are ineffective at discovering unknown bugs or defects, such as resource leaks, memory leaks, null pointer dereferences, and concurrency errors, which are difficult to detect deterministically. Regardless of the amount of testing that is performed on a program, the program may still contain bugs.

Software maintenance makes the corrective measures needed to fix software bugs after the bugs are reported by end users. Fixing the software bugs after deployment of the program hampers the usability of the deployed program and increases the cost of the software maintenance services. Detecting the software bugs prior to the release of the program is a preferred solution. However, when a program includes tens of millions of lines of code, bug detection becomes a complicated task. that the task needs to be performed within the constraints of resource and developer availability which may be limited.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A language interoperability system enables programs supported by the .NET framework to use an incompatible interprocedural static code analyzer to detect memory safety faults. Programs supported by the .NET framework are converted into an associated intermediate language from which a language-independent representation is derived. The language-independent representation contains a control flow graph of the program and a language-independent representation of the type environment. The language-independent control flow graph contains intermediate analysis instructions that correspond to the original intermediate language instructions.

The language-independent representations are then transformed into a set of analysis language instructions supported by the interprocedural static code analyzer. The interprocedural static code analyzer analyzes the program through a logic-based analysis in order to detect potential memory safety faults such as null pointer dereferences, race conditions, and memory leaks.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 5 is an exemplary illustration of the procedure description of a language-independent CFG.

FIG. 6 is an exemplary illustration of the node description of the language-independent CFG shown in FIG. 5.

FIG. 7 is an exemplary illustration of a type environment for the C# method shown in FIG. 3.

DETAILED DESCRIPTION

Overview

Aspects of the present invention pertains to the interoperability of programs supported by the .NET framework with an analysis language used for an interprocedural static code analysis. The .NET framework is collection of programming languages and development tools (e.g., compilers, libraries, runtime, specifications, intermediate language) used to develop and execute software (e.g., applications, programs, code) to runs on Microsoft® operating systems. Interprocedural static code analysis is a technique that analyzes programs for memory safety issues such as null pointer dereferences, memory leaks, and resource leaks. One particular interprocedural static code analyzer uses Separation Logic in its memory safety analysis of a programs. The analysis language is not compatible with a number of commonly-used programming languages and development frameworks.

The mechanisms and techniques described herein provide a language interoperability system that allows programs supported by the .NET framework and other programming languages (e.g., Python, JavaScript), to utilize code analysis tools having limited cross-language tools. Language interoperability issues arise due to analyzer's reliance on a relatively uncommon analysis language that has limited cross-language libraries and other tools to facilitate language interoperability. The language interoperability system disclosed herein is a bridge that accounts for the limitation of cross-language tools.

Attention now turns to a further discussion of the system, devices, components, and methods that facilitate language interoperability with incompatible programs.

System

Figure 1:
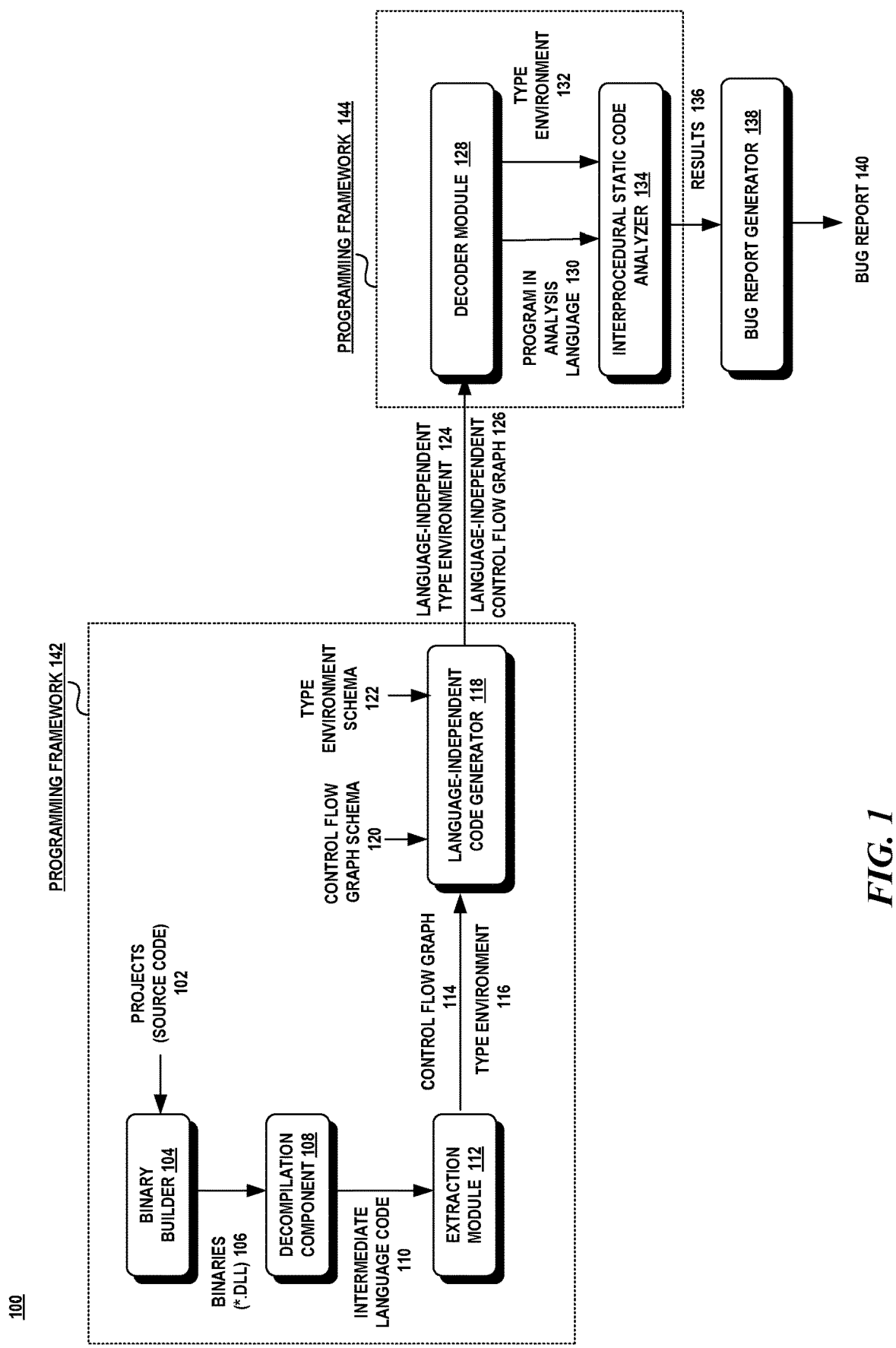
FIG. 1 illustrates an exemplary language interoperability system for statically analyzing a program.

FIG. 1 illustrates an exemplary system 100 in which various aspects of the invention may be practiced. The system 100 includes a binary builder 104, a decompilation component 108, an extractor module 112, a language-independent code generator 118, a decoder module 128, an interprocedural static code analyzer 134, and a bug report generator 138.

The binary builder 104 compiles one or more source code programs 102 into a binary file 106. The source code files may be part of a project 102 which is an aggregation of source code files that are related and typically compiled together to form an assembly or binary file 106. There may be tens of millions of source code files associated with a project. The source code files of the project may be developed in an integrated development environment (IDE) which stores the aggregated source code files into a folder or directory set up for the project. The project may include tests, libraries, and/or build settings used in the project's development.

A binary file 106 is a non-text file format for executables, object code and dynamic linked libraries (DLL). A DLL is a collection of programs that are dynamically linked with an application that uses them during program execution instead of being compiled into a main application.

The decompilation component 108 translates the binary code into an associated intermediate language code 110. An intermediate language (IL) is an assembly language that gets transformed into bytecode during execution of a language virtual machine. In one aspect, the intermediate language is the Microsoft® Common Intermediate Language (CIL) which is defined by the Common Language Infrastructure (CLI) specification. The CIL instructions are executed by a Common Language Runtime (CLR) which converts the CIL instructions into native code.

The extraction module 112 reads the CIL code and generates the type environment of the program 102. A type environment 116 describes the set of types used in a program. A type environment includes user-defined types and types supported by the programming language of the program. A type is a data attribute that indicates the intended use of the data. The term "type" is based on the type system of a programming language. For example, in a strongly-typed programming language, such as C#, the type system includes value types and reference types. A value type has its own copy of the data and a reference or non-primitive type stores a reference to the data. Value types in C# include simple type, enum types, struct types, and nullable value types. Reference types in C# include class types, interface types, array types and delegate types. A class type defines a data structure that contains data members, such as fields, and function members, such as methods and properties. In one aspect of the disclosure, a "type" pertains to a non-primitive or reference type. However, it should be noted that the disclosure is not limited to just non-primitive types and may be applied to any other code constructs or combinations thereof.

The extraction module 112 also generates a control flow graph of the program with intermediate analysis instructions 114 of the interprocedural static code analyzer 134. A control flow graph is a graphical representation of the computational flow of a program. The control flow graph is composed of nodes and edges. A node represents a basic block which has no branches into the basic block except to the one entry point and no branches out except through an exit point. An edge represents a transition from one basic block to another basic block. The control flow graph is initially generated with each basic block having the CIL instructions. The extraction module 112 transforms the CIL instructions into equivalent intermediate analysis instructions.

The language-independent code generator 118 translates the control flow graph into a language-independent representation. A language-independent representation is one which does not contain instructions of a computer programming language. In one aspect, the language-independent representation is the JavaScript Object Notation (JSON). JSON is a format for storing and exchanging data as data objects represented as attribute-value pairs and array data types. The language-independent code generator 118 transforms the control flow graph 114 into a language-independent code that adheres to a CFG schema 120 and the type environment into a language-independent code that adheres to a type environment schema 122.

The data of the language-independent control flow graph 126 and the language-independent type environment 124 is serialized into a file as byte strings. The decoder module 128 deserializer the byte strings in order to translate the serialized language-independent control flow graph into a program consisting of an ordered sequence of intermediate analysis instructions. The decoder module 128 also translates the serialized language-independent type environment into a data structure (e.g., database) for use by interprocedural static code analyzer 134.

The interprocedural static code analyzer 134 analyzes program code without executing the program. The analysis is interprocedural rather than intraprocedural. An intraprocedural analysis is performed within a method, otherwise referred to as a procedure or function. An interprocedural analysis spans multiple files or methods, including all the methods in the entire program. An interprocedural static code analysis is able to detect memory safety faults or bugs that span multiple files or methods, such as null pointer dereferencing and memory leaks, which would be missed if intraprocedural static analysis were used. Null pointer dereference occurs when the program dereferences a pointer that it expects to be valid, but is null, or points to memory that has not been allocated. Null pointer dereferences typically cause the program to crash or exit. A memory leak occurs when a program allocates memory without eventually releasing it. Eventually, the program will exhaust all the available memory and crash when the program attempts to allocate additional memory.

In one aspect, the interprocedural static code analyzer 134 is Facebook®'s Infer. Infer is based on separation logic that performs Hoare-logic reasoning about programs that mutate data structures. Infer uses the analysis language, Smallfoot Intermediate Language (SIL), to represent a program in a simpler instruction set that describes the program's actions on a symbolic heap. Infer symbolically executes the SIL commands over a symbolic heap according to a set of separation logic proof rules in order to discover program paths with the symbolic heap that violate heap-based properties.

It should be noted that SIL differs from intermediate languages, such as CIL, that represent instructions that can be transformed into native code. SIL instructions are used for a symbolic execution which is a logic-based proof analysis. The SIL instructions are not constructed to be executed on a processor or CPU such as the CIL instructions.

The interprocedural static code analyzer 134 generates results that may indicate a potential bug or memory safety fault within the program. The results 136 are output to a bug report generator 138. The results 136 indicate the file name and line of the detected bug. The results may be output in a bug report 140. Alternatively, the bug report generator 138 may map the location of the bug back to the original source code which may be displayed in a user interface along with the original source code.

It should be noted that the components and system described above is not limited to .NET-based programming languages (e.g., C#, F#, Visual Basic) that utilize CIL. Other languages, such as Python and JavaScript may utilize the language interoperability system described above. Python code may be converted into Python bytecodes and JavaScript programs may be converted into an intermediate language which is then transformed into the analysis language through the language-independent code.

Although the techniques described herein are explained with respect to the Infer interprocedural static code analyzer, the aspects are not limited to this particular code analysis. In some aspects, the techniques described herein may be used to translate a program into language-independent code in order to interface with any type of verification language or analysis tool. For example, the interoperability system may be used to interface with a code optimizer, a code analyzer that identifies software vulnerabilities other than memory safety faults, and a code equivalence tool that identifies code for reuse. In addition, the interoperability system may be used with an automated program repair tool that find bugs and generates a repair patch that is applied to the faulty portion of code.

In one or more aspects, the binary builder 104, decompilation component 108, extraction module 112, language-independent code generator 118, decoder module 128, interprocedural static code analyzer 134, and bug report generator 138 may be a sequence of computer program instructions, that when executed by a processor, causes the processor to perform methods and/or operations in accordance with a prescribed task. The binary builder 104, decompilation component 108, extraction module 112, language-independent code generator 118, decoder module 128, interprocedural static code analyzer 134, and bug report generator 138 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function.

The instructions may be implemented using any suitable high-level, low-level, object-oriented, visual, compiled and/or interpreted programming language. In one aspect, the binary builder 104, decompilation component 108, extraction module 112, language-independent code generator 118 are written in programming languages that are part of programming framework 142 and the decoder module 128 and interprocedural static code analyzer are written in programming framework 144 that supports programs written in the Objective Categorial Abstract Machine Language (OCAML) programming language.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
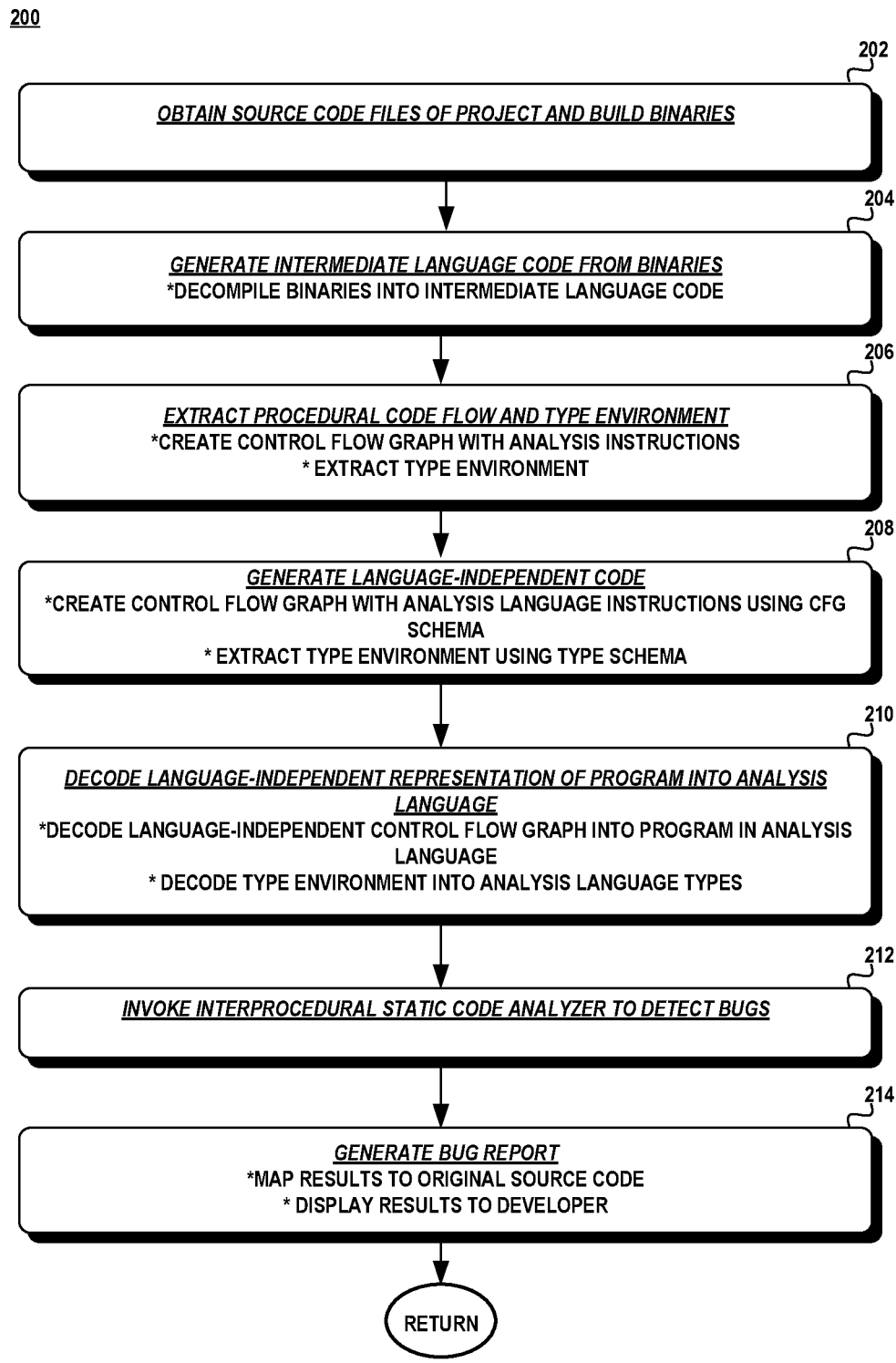
FIG. 2 is a flow diagram illustrating an exemplary method of a language interoperatibility system for statically analyzing a program.

Attention now turns to an exemplary method 200 describing the language interoperability process. Turning to FIGS. 1 and 2, one or more source code files 102 requiring static code analysis are compiled into one or more binary files (block 202). A decompilation component 108 decompiles each binary file into intermediate language code 110 associated with the programming language of the source code (block 204).

The extraction module 112 generates a control flow graph 114 for the entire program that is composed of control flow graphs of each method in the program. The control flow graph includes three components: a procedure list; nodes and edges; and a priority set. A procedure list identifies all the procedures or methods available in the source code to be analyzed. Each procedure includes metadata that describes the method in further detail, such as the method name, the method parameters, the return type and the method's local variables. The nodes and edges of the graph describe the control flow within a method and within the overall program. The nodes represent a basic block and contain one or more SIL instructions that correspond to an equivalent intermediate language instruction. The edges represent the execution flow of the program. A priority set represents the order in which the methods are to be analyzed. (Collectively, block 206).

The extraction module 112 also generates the type environment of the program 116. The type environment 116 contains data on all the non-primitive data types, interfaces, and abstract classes used in each source code file of the program. The extracted type data includes the full name of a type, the namespace associated with the type, the classes from which the type inherits, the instance fields of the type, the static fields of the types, methods and superclasses. An instance field includes field variables belonging to a type instance, a static field includes field variables that belong to a type, methods are executable functions or procedures, and superclasses are classes from which a type derives. (Collectively, block 206).

The language-independent code generator 118 produces a language-independent version of the control flow graph and the type environment. The language-independent code generator uses a type environment schema 122 to represent the language-independent type environment 124 and a CFG schema 114 to represent the language-independent control flow graph 126. In one aspect, the language-independent code files are implemented as JSON files. The data in the JSON files is serialized into byte strings when stored and deserialized when read out from the JSON file. (Collectively, block 208).

In one aspect, the JSON files are read by a decoder module 128 that extracts the data from the language-independent control flow graph 126 and language-independent type environment 124 and generates a corresponding SIL program 130 (block 210). The interprocedural static code analyzer 134 is invoked to analyze the program for memory safety faults (block 212). The results 136 of the interprocedural static code analyzer is output through a bug report 140 generated by the bug report generator 138 or visually displayed to the developer (block 214).

Exemplary Illustrations

Attention now turns to FIGS. 3-7 which illustrate the language interoperability technique for an exemplary C# program to utilize the OCAML-based Infer analysis engine. It should be noted that this example is for illustration purposes only and not intended to limit the disclosure to this particular example.

Figure 3:
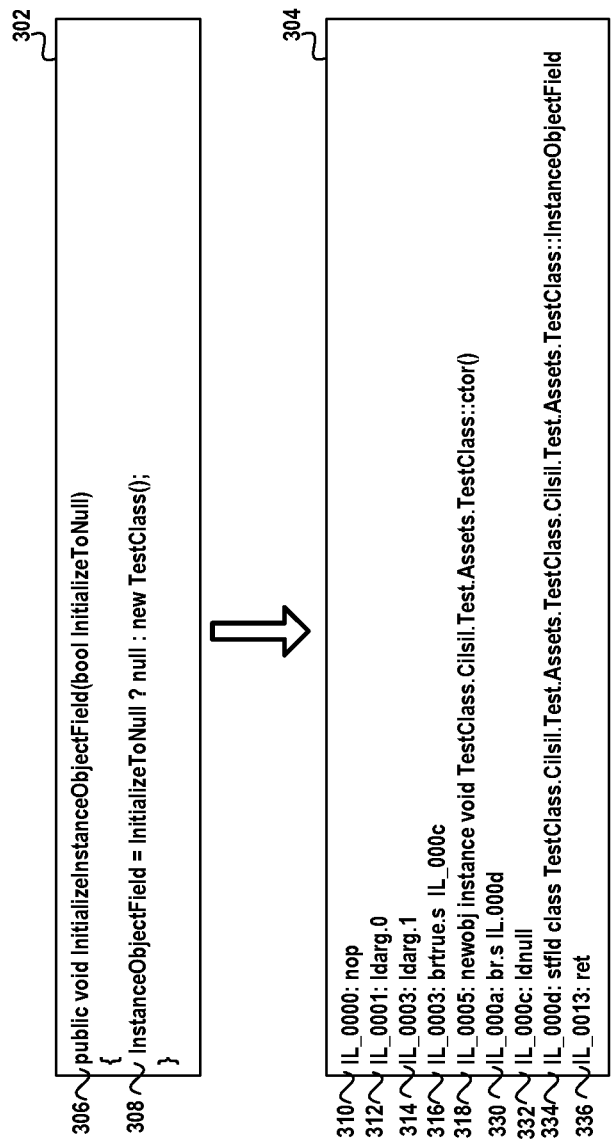
FIG. 3 is an exemplary illustration of a C# method that is converted into corresponding Common Intermediate Language (CIL) instructions.

Turning to FIG. 3, there is shown a program 302 written in the C# programming language having method 306, InitializeInstanceObjectField. The method 306 receives a boolean parameter, initializeToNull, which initializes an instance field of type TestClass to null if the boolean parameter is true and false otherwise. The method is converted into corresponding CIL instructions 304.

The CIL instructions include a nop instruction 310 which does not execute. The ldarg.0 instruction 312 pushes the first argument onto the program stack. The first argument is this since InitializeInstanceObjectField is an instance method. The equivalent SIL Load instruction is n$0=*this:Cilsil.Test.Assets.Test.Class* which indicates that the VarExpression n$0 refers to the value of this, which is of type Cilsil.Test.Assets.Test.Class.

The ldarg.1 instruction 314 pushes the second argument onto the program stack. This instruction is translated into the SIL load instruction n$1=*initializeToNull:bool, which indicates that the VarExpression n$1 refers to the value of initializeToNull.

The brtrue.s IL_000c instruction 316 pops the item at the top of the program stack, which is the value of initializeToNull, and if it evaluates to true, control transfers to instruction IL_000c. This instruction translates to the SIL Prune instruction, which branches on the value of n$1. If the value of n$1 is true (SIL instruction Prune (n$1, True)), then the ldnull instruction 332 causes null to be pushed onto the program stack. If the value of n$1 is false (SIL instruction Prune(n$1, False)), then an instantiated TestClass object is pushed onto the program stack.

The stfld instruction 334 replaces the value stored in the field of an object reference with a new value. This instruction gets translated to the SIL store instruction, *n$0.InstanceObjectField=null, or the SIL store instruction that stores the instantiated object into n$0.InstanceObjectField. The ret instruction 336 exits the method.

Figure 4:
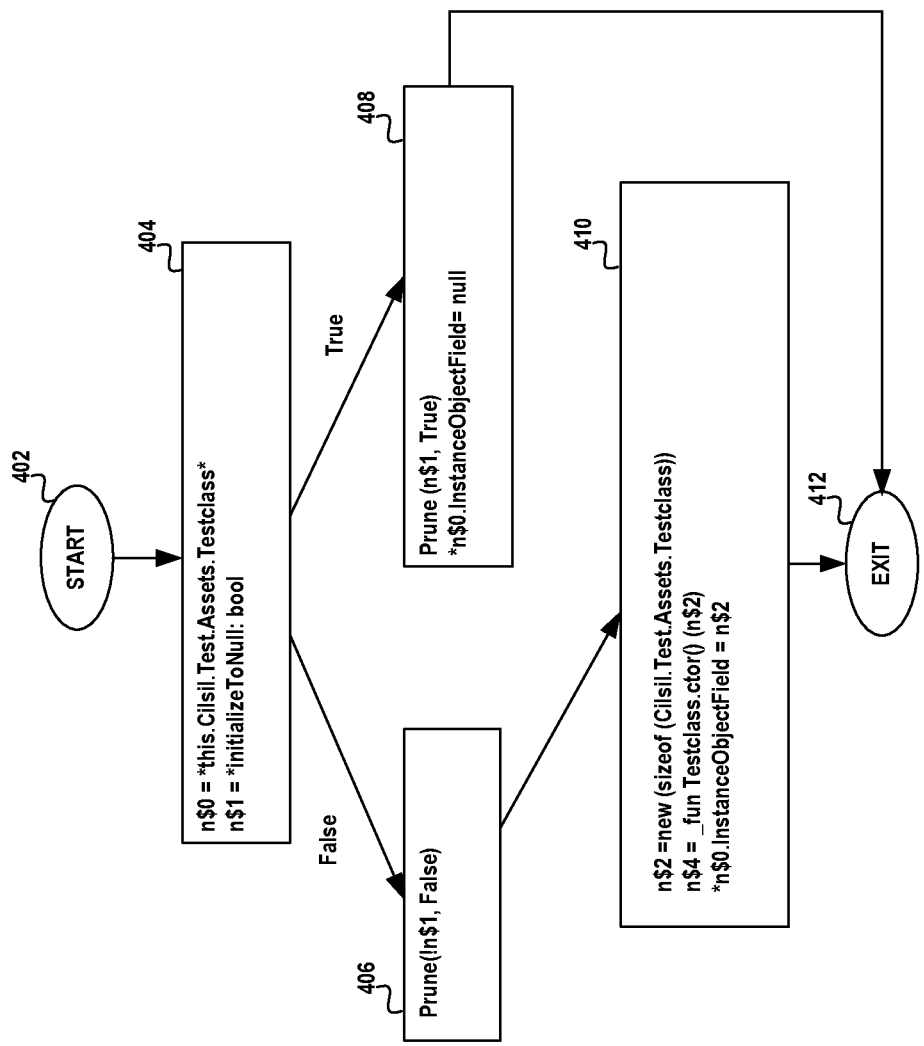
FIG. 4 is an exemplary illustration of a control flow graph (CFG) of the C# method shown in FIG. 3 including Smallfoot Intermediate Language (SIL) instructions.

Turning to FIGS. 3 and 4, there is shown the CFG 400 representing the method 302 and its corresponding CIL instructions 304. Each node in the CFG 400 contains the SIL instruction corresponding to a CIL instruction. The edges represent the control flow from one node to another node through the program. The CFG 400 includes several nodes. There is a start node 402, node 404 which contains the SIL instructions that correspond to the CIL instructions ldarg.0 and ldarg.1, node 406 represents the false branch of the test for the value of the InitializeToNull argument, node 408 represents the true branch of the test for the value of the InitializeToNull argument, and node 410 instantiates a TestClass object and stores the value of the InitalizeToNull argument into InstanceObjectField.

FIGS. 5 and 6 illustrate an exemplary schema of the language-independent code of the control flow graph 500. The language-independent code of the CFG consists of different components. There is a JSON file for the methods (i.e., function, procedure) in the program, and a JSON file that describes each of the nodes in the CFG. FIG. 5 illustrates the schema of a JSON file for the method, InitializeInstanceObjectFields, of FIG. 4. FIG. 6 illustrates the schema of a JSON file for node 12 of the control flow graph of FIG. 5.

Referring to FIG. 5, the schema includes an entry for each procedure or method 502 and each method entry includes an identifier for the procedure. As shown in the procedure description 500, pd_id, 504 is the identifier of procedure 2. The schema also includes the attributes of the procedure 506, the location of the procedure in the program 518, the return type of the procedure 520, and the nodes of the procedure in the node list 522. The attributes of the procedure 506 include an access attribute 508, data on the procedure signature 510 which includes the procedure name, parameter, class name, return type, and an indication of whether the procedure is a static method. The attributes of the procedure 506 also includes descriptions of each formal parameter 514, 516. The location of the procedure 518 includes the line number and column number in the source file, the path of the source file, and the name of the source file.

FIG. 6 illustrates an exemplary schema for the nodes in the node list. The schema 600 has an entry for each node and it is identified by a node identifier, nd_id, that corresponds to the identifier in the pd_nodes field in the procedure description file of FIG. 5. FIG. 6 shows an entry for node 9, "nd_id":9, 602, which is the start node 402 of the CFG of FIG. 4 and for node 12, "nd_id":12, 604. The attribute-values pairs 606 for node 12 correspond to the first statement of block 404 of the control flow graph in FIG. 4 (n$0=*this.Cilsil.Test.Assets.Testclass*).

The node schema contains an attribute stmt_node_kind 608 that describes the statements in the node, which for node 12 indicates that the statements of node 12 are in the method body. The attribute nd_instrs 610 describes the instructions of node 12. The identifier 612 represents n$0 and the expression 614 represents the expression, n$0=*this.Cilsil.Test.Assets.Testclass*, including the variables used in the expression, the variable type (e.g., local variable) and the type of expression. The location attribute 620 describes the line and column in the source file where the corresponding instruction is located.

FIG. 7 represents an exemplary schema for the type environment 700. The type environment shown in FIG. 7 is a portion of the type environment for the class Cilsil.Test.Assets.Testclass. The type is identified in the type name attribute 702, the instance fields and static fields are identified in the type struct attribute 704, the super classes are identified in the supers attribute 706, and the methods of the class are identified in the methods attribute 708.

Figure 8:
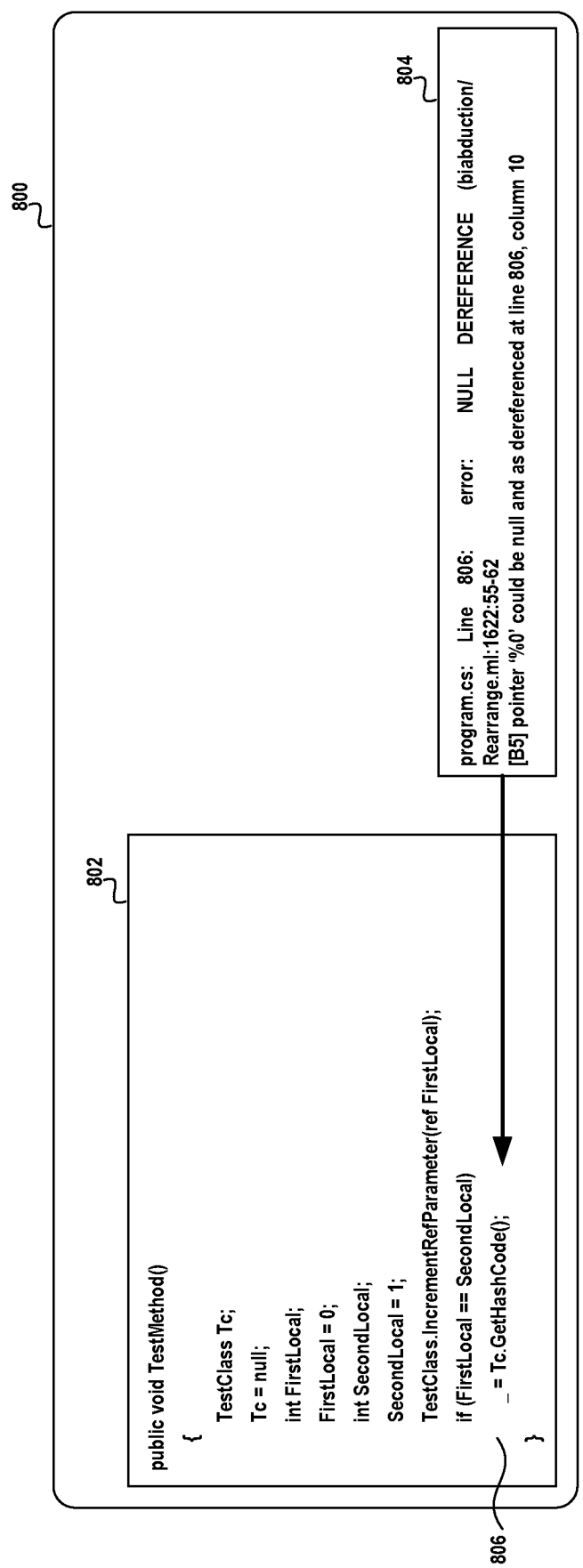
FIG. 8 is an exemplary display of the output of an interprocedural static code analysis.

Attention now turns to FIGS. 1 and 8 which depicts an exemplary user interface illustrating a bug report. A bug report may take many different formats. FIG. 8 shows one such format in which a pop-up window 804 displays the result of the interprocedural static code analysis in a user interface 800 that displays the source code 802. In this aspect, the language interoperability system may be embedded in a software development tool, such as a source code editor or IDE. The interprocedural static code analysis is performed in the software development tool which uses the bug report generator 138 to map the location of the identified memory safety fault back to the line number of the source code program having the fault. As shown in FIG. 8, the result indicates that line 806, _=Tc.GetHashCode( ), has a possible pointer null deference since the return value of Tc may be null.

Repository Service Deployment

The language interoperability system described above may be deployed in a source-controlled repository. Programmers often utilize a source-controlled repository to store source code and other programming artifacts that can be shared among different programmers. A source control system or version control system typically stores each version of the programming artifact and tracks the changes or differences between the different versions. Repositories managed by source control systems are distributed so that each user of the repository has a working copy of the repository. The source control system coordinates the distribution of the changes made to the contents of the repository to the different users.

The source control system is often implemented as a cloud or web service that is accessible to various programmers through online transactions over a network. A programmer may check out an artifact, such as a source code file, and edit a copy of the file in its local machine. When the user is finished with editing the source code file, the user performs a commit which checks in the modified version of the source code file into the source-controlled repository. In one aspect, the source control system is GitHub.

Figure 10:
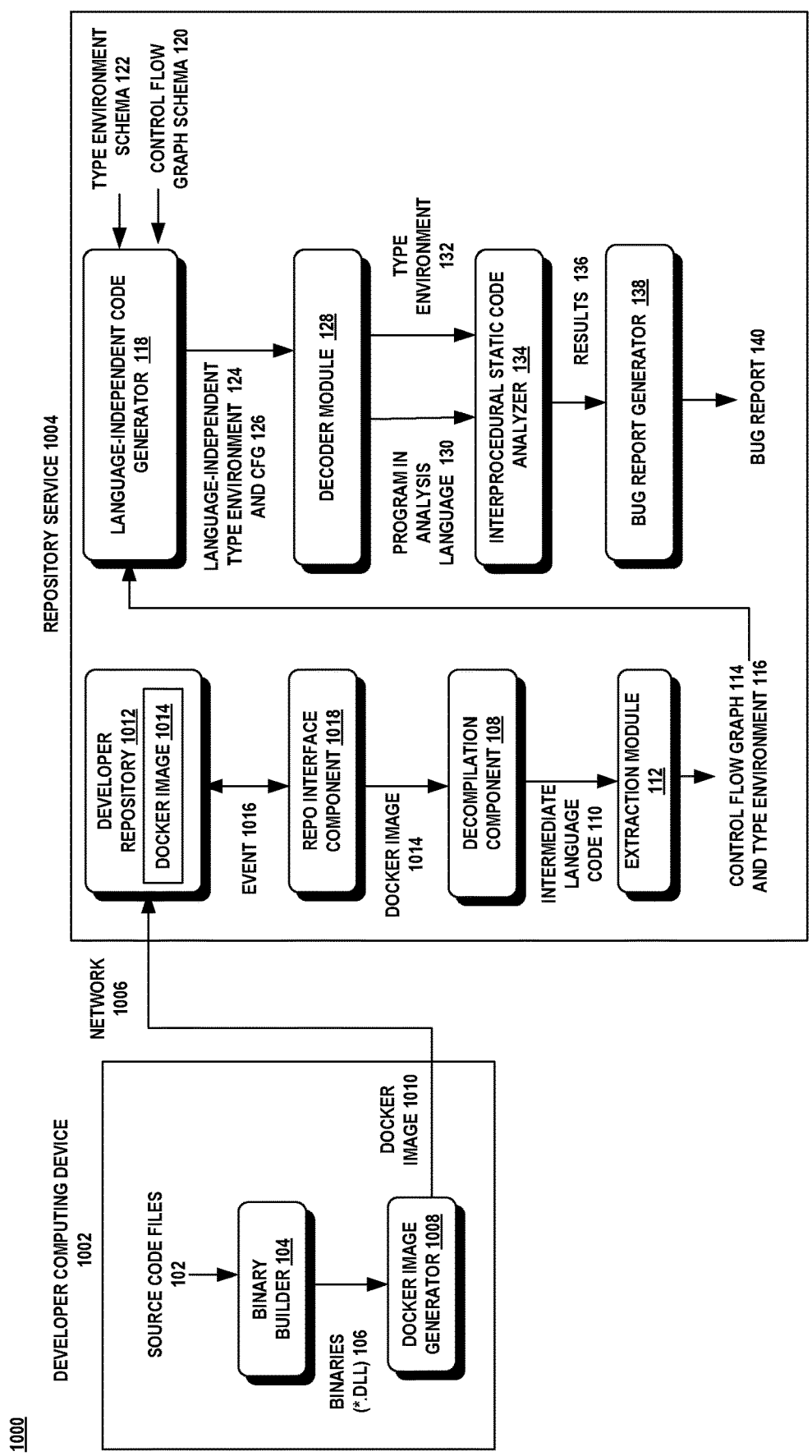
FIG. 10 is a block diagram illustrating a repository service having a language interoperability pipeline that automates code analysis with programs stored within a repository.
Figure 11:
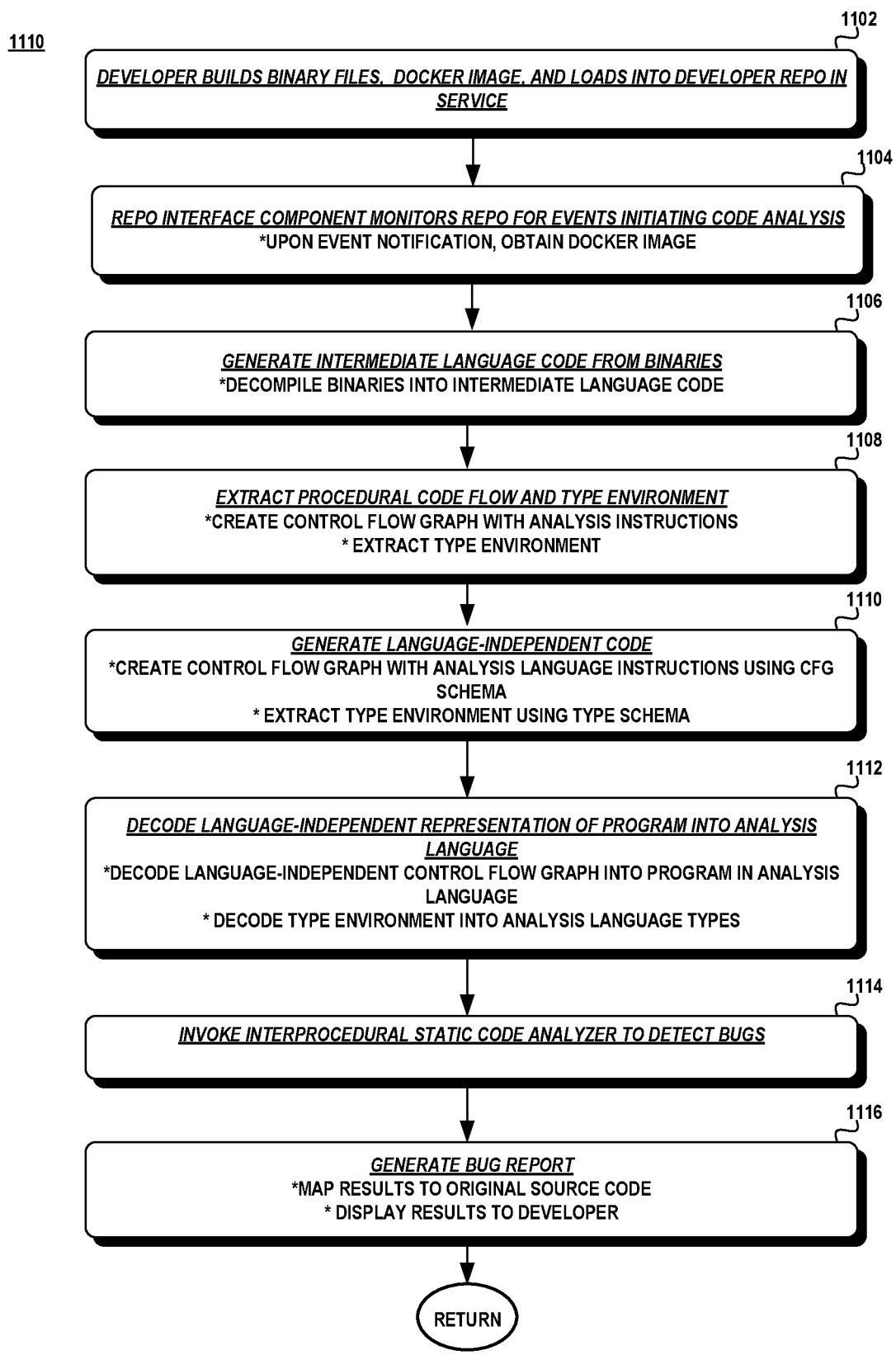
FIG. 11 is a flow diagram illustrating the automated language interoperability pipeline.

The language interoperability system described above may be embodied as a service that is integrated with a source-control system. Referring to FIGS. 10 and 11, a developer computing device 1002 interacts through a network 1006 with a repository service 1004. The repository service 1004 may include a version control system which developers use to share code with other members of a development community.

A developer, using a developer computing device 1002, may check out one or more source code files from the repository service 1004 or create source code files. The source code files 102 are edited and tested and the binary builder 104 is used to generate corresponding binary files (block 1102). A docker image generator 1008 packages the binary files into a container, such as a docker image 1010 that contains the binary files and all its dependent files, such as libraries, settings, tools, executable files, etc., needed to execute the program (block 1102). The docker image 1014 is stored into the developer's repository 1012 in the repository service 1004 (block 1102).

The repository service 1004 includes a repo interface component 1018 that interacts with the developer repository 1012 to analyze source code files awaiting review. An event notification may alert the repo interface component 1018 to initiate a code analysis review (block 1104). The repo interface component 1018 pulls the Docker image from the developer repository and constructs the language-independent control flow graph and language-independent type environment as described above.

The decompilation component 108 decompiles the binary files into CIL intermediate language code 110 (block 1106) from which the extraction module 112 generates a control flow graph with analysis language instructions 114 and a type environment 116 (block 1108). The language independent code generator 118 uses a type environment schema 122 and a control flow schema 120 to generate a language-independent type environment 124 and language-independent type control flow graph 126 (block 1110). The decoder module 128 transforms the language-independent control flow graph and language-independent type environment into a program of analysis language instructions and a compatible type environment for the interprocedural static code analysis (block 1112). The interprocedural static code analyzer 134 analyzes the program for memory safety faults or bugs (block 1114) which are output as results 136 that the bug report generator 136 produces in a bug report 140 (block 1116).

Exemplary Operating Environment

Figure 9:
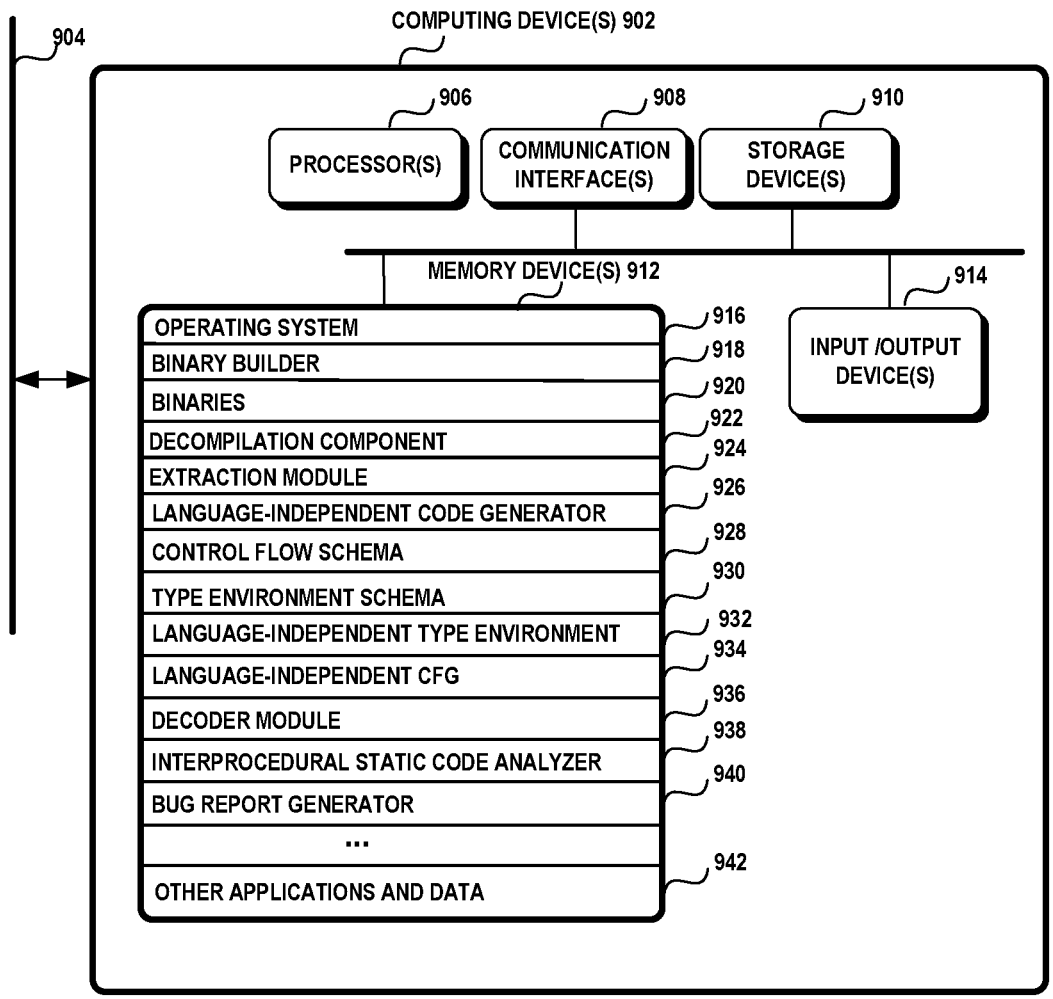
FIG. 9 is a block diagram illustrating an exemplary operating environment.

Attention now turns to a discussion of an exemplary operating environment. FIG. 9 illustrates an exemplary operating environment 900 used to generate examples for command-line commands. The operating environment 900 may be configured as a cloud service having multiple computing devices or configured as a single computing device. The computing devices 902 are coupled to a network 904 to other computing devices. However, it should be noted that the aspects disclosed herein is not constrained to any particular configuration of devices and that other configurations are possible.

A computing device 902 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 900 may be configured in a network environment, a distributed environment, a multi-processor environment, or a stand-alone computing device having access to remote or local storage devices.

A computing device 902 may include one or more processors 906, one or more communication interfaces 908, one or more storage devices 910, one or more input/output devices 914 and one or more memory devices 912. A processor 906 may be any commercially available or customized processor and may include dual microprocessors and multi-processor architectures. A communication interface 908 facilitates wired or wireless communications between the computing devices and other devices.

A storage device 910 may be computer-readable medium that does not contain propagating signals, such as modulated data signals transmitted through a carrier wave. Examples of a storage device 910 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 914 may include a keyboard, mouse, pen, voice input device, touch input device, display, speakers, printers, etc., and any combination thereof.

A memory device 912 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 912 may also include one or more external storage devices or remotely located storage devices that do not pertain to propagated signals, such as modulated data signals transmitted through a carrier wave.

Memory devices 912 may include an operating system 916, a binary builder 918, binary files or binaries 920, a decompilation component 922, extraction module 924, a language-independent code generator 926, a control flow schema 928, a type environment schema 930, a language-independent type environment 932, a language-independent control flow graph 934, a decoder module 936, an interprocedural static code analyzer 938, a bug report generator 940, and other application and data 942.

Network 904 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

A network 904 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having one or more processors coupled to a memory. The system has one or more programs, wherein the one or more programs are stored in the memory and configured to be executed by the one or more processors. The one or more programs including instructions that: generate a language-independent control graph of a first program and language-independent type environment of the first program; convert the language-independent control graph into a second program consisting of analysis language instructions of an interprocedural static code analyzer; and invoke the interprocedural static code analyzer on the second program to detect a memory safety fault in the first program.

In one aspect, the one or more program includes further instructions that: generate a control flow graph of a first program from intermediate language instructions of the first program, the control flow graph including the analysis language instructions, wherein the intermediate language instructions differ from the analysis language instructions; and transform the control flow graph into the language-independent control flow graph. In one aspect, the one or more programs include further instructions that: extract a type environment of the first program from the intermediate language instructions of the first program; and generate the language-independent type environment from the type environment.

In one aspect, the one or more programs include further instructions that: detect a commit change to the first program from a source-controlled repository; and extract a binary file of the commit change from the source-controlled repository.

In an aspect, the one or more programs include further instructions that: convert the commit change into the intermediate language instructions. In an aspect, the language-independent code is based on a JavaScript Notation (JSON) format. In an aspect, the intermediate language instructions are based on a Common Intermediate Language (CIL) and the analysis language instructions are based on a Smallfoot Intermediate Language (SIL).

A method is disclosed comprising: analyzing a first program to generate a language-independent control flow graph of the first program and a language-independent type environment of the first program; transforming the language-independent control flow graph into a second program, the second program including instructions of an analysis language of an interprocedural static code analyzer; and applying the interprocedural static code analyzer to the second program to identify a memory safety fault in the first program.

In one aspect, the method further comprises: extracting the first program from a source-controlled repository; converting the first program into intermediate language instructions; and generating the language-independent control flow graph from the intermediate language instructions. In an aspect, the method further comprises: upon activation of a commit change in the source-controlled repository, extracting a binary file of the first program from the source-controlled repository. In one aspect, the method further comprises: decompiling the binary file into the intermediate language instructions. In one or more aspects the language-independent type environment is based on a JavaScript Object Notation (JSON) format. The language-independent control graph is based on a JSON format. In an aspect the first program is written in a programming language supported by the .NET framework and the interprocedural static code analyzer is written in a programming language that is not support by the .NET framework. The memory safety fault includes one of a null pointer dereference, race condition or memory leak.

A device is disclosed comprising: at least one processor and a memory. The at least one processor is configured to: generate a language-independent control graph of a first program, the language-independent control graph including instructions of an analysis language of an interprocedural static code analyzer; generate a second program from the language-independent control graph, the second program including the analysis language instructions; and apply the interprocedural static code analyzer to the second program to find a memory safety fault in the first program.

In an aspect, the at least one processor is further configured to: transform the first program into intermediate language instructions; generate a control flow graph of the first program from the intermediate language instructions; and convert each intermediate language instruction in the control flow graph into a corresponding analysis language instruction. In one aspect, the at least one processor is further configured to: generate a language-independent type environment of the first program using the intermediate language instructions.

In one aspect, the at least one processor is further comprised: convert the language-independent type environment of the first program into a type data structure compatible with the interprocedural static code analyzer. In one aspect, the language-independent control graph is based on a JavaScript Notation format.

In the description above, specific details of various aspect are provided. However, some aspects may be practiced with less than all of the specific details and in other aspects, certain methods, procedures, components, structures, devices, processes and/or functions are described in no more detail than to enable the various aspects of the invention for the sake of brevity and clarity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors coupled to a memory; and
one or more programs, wherein the one or more programs are stored in the memory and configured to be executed by the one or more processors, the one or more programs including instructions that perform actions to:
monitor a source code repository for an event associated with a first program that necessitates code review; and
upon occurrence of the event:
generate a language-independent control flow graph of the first program and a language-independent type environment of the first program;
convert the language-independent control flow graph of the first program into a second program, wherein the second program includes analysis language instructions of an interprocedural static code analyzer; and
invoke the interprocedural static code analyzer on the second program to detect a memory safety fault or bug in the first program.

2. The system of claim 1, wherein the one or more programs include further instructions that perform actions to:
extract binary files of the first program;
decompile the binary files of the first program into intermediate language code; and
extract a procedural code flow for the first program and a type environment for the first program from the intermediate language code of each of the binary files of the first program, wherein the procedural code flow for the first program includes the analysis language instructions of the interprocedural static code analyzer.

3. The system of claim 2, wherein the one or more programs include further instructions that perform actions to:
create the procedural code flow for the first program using a control flow graph schema; and
extract the type environment for the first program using a type schema.

4. The system of claim 2, wherein the one or more programs include further instructions that perform actions to:
generate language-independent code for the first program from the procedural code flow for the first program and the type environment for the first program.

5. The system of claim 4, wherein the one or more programs include further instructions that perform actions to:
decode the language-independent code for the first program into the second program having the analysis language instructions of the interprocedural static code analyzer; and
decode the type environment for the first program into types of the analysis language instructions of the interprocedural static code analyzer.

6. The system of claim 4, wherein the language-independent code for the first program is based on a JavaScript Notation (JSON) format.

7. The system of claim 2, wherein the intermediate language code is based on a Common Intermediate Language (CIL).

8. A computer-implemented method comprising:
extracting binary files of a first program from a version-controlled source code repository;
converting the binary files of the first program into intermediate language instructions;
analyzing the intermediate language instructions to generate a language-independent control flow graph of the first program and a language-independent type environment of the first program;
transforming the language-independent control flow graph of the first program into a second program, wherein the second program includes instructions of an analysis language of an interprocedural static code analyzer; and
applying the interprocedural static code analyzer to the second program to identify a memory safety fault or bug in the first program.

9. The computer-implemented method of claim 8, wherein extracting binary files of a first program from a version-controlled source code repository, further comprises:
detecting, at the version-controlled source code repository, an event triggering code analysis of the first program; and
upon detection of the event triggering code analysis of the first program, obtaining the binary files of the first program from the version-controlled source code repository.

10. The computer-implemented method of claim 9, wherein the event triggering code analysis of the first program includes a commit of the first program to the version-controlled source code repository.

11. The computer-implemented method of claim 8, further comprising:
mapping results from application of the interprocedural static code analyzer to source code of the first program.

12. The computer-implemented method of claim 8, wherein the first program is written in a programming language supported by the .NET framework and the interprocedural static code analyzer is written in a programming language not supported by the .NET framework.

13. The computer-implemented method of claim 8, wherein the intermediate language instructions are Common Intermediate Language (CIL) instructions.

14. The computer-implemented method of claim 8, wherein the language-independent control flow graph of the first program and the language-independent type environment of the first program are based on a JavaScript Object Notation (JSON) format.

15. A computer-implemented method comprising:
detecting an event triggering a code review of a first program in a version-controlled source code repository; and
performing the code review of the first program by:
converting the first program into language-independent code;

decoding the language-independent code into a second program having instructions of an interprocedural static code analyzer;

invoking the interprocedural static code analyzer on the second program to detect source code bugs in the second program;

mapping the detected source code bugs back to the first program; and outputting the detected source code bugs in the first program.

16. The computer-implemented method of claim 15, wherein converting the first program into the language-independent code, further comprises:

converting the first program into intermediate language code;

extracting a control flow graph of the first program and a type environment of the first program from the intermediate language code;

generating a language-independent control flow graph from the extracted control flow graph of the first program; and generating a language-independent type environment from the extracted type environment of the first program.

17. The computer-implemented method of claim 16, further comprising:

prior to converting the first program into the intermediate language code, obtaining binary files of the first program.

18. The computer-implemented method of claim 16, further comprising:

serializing data of the language-independent control flow graph and data of the language-independent type environment into byte strings; and deserializing the byte strings of the language-independent control flow graph into the second program having ordered sequences of intermediate analysis instructions.

19. The computer-implemented method of claim 18, further comprising:

deserializing the byte strings of the language-independent type environment into a data structure for use by the interprocedural static code analyzer.

20. The computer-implemented method of claim 15, wherein the first program is written in a programming language supported by the .NET framework and the interprocedural static code analyzer is written in a programming language not supported by the .NET framework.

* * * * *